(12) United States Patent
Azhagesan

(10) Patent No.: US 11,717,710 B2
(45) Date of Patent: Aug. 8, 2023

(54) PERSONAL PROTECTIVE NOSE MASK

(71) Applicant: Muthukumaran Azhagesan, Santa Clara, CA (US)

(72) Inventor: Muthukumaran Azhagesan, Santa Clara, CA (US)

(73) Assignee: Bell Alaguraj Muthukumaran, Santa Clara, CA (US)

( * ) Notice: Subject to any disclaimer, the term of this patent is extended or adjusted under 35 U.S.C. 154(b) by 0 days.

(21) Appl. No.: 17/110,218

(22) Filed: Dec. 2, 2020

(65) Prior Publication Data
US 2022/0168599 A1 Jun. 2, 2022

(51) Int. Cl.
*A62B 23/00* (2006.01)
*A62B 23/06* (2006.01)
*B01D 39/18* (2006.01)

(52) U.S. Cl.
CPC .............. *A62B 23/06* (2013.01); *B01D 39/18* (2013.01); *B01D 2239/0442* (2013.01)

(58) Field of Classification Search
CPC . A62B 23/06; B01D 39/18; B01D 2239/0442
See application file for complete search history.

(56) References Cited

U.S. PATENT DOCUMENTS

| | | | | |
|---|---|---|---|---|
| 3,905,335 A * | 9/1975 | Kapp | ..................... | A63B 33/00 128/206.11 |
| 4,052,983 A * | 10/1977 | Bovender | .............. | A62B 23/06 128/204.12 |
| 4,327,719 A * | 5/1982 | Childers | ................ | A62B 23/06 128/203.22 |
| 6,216,694 B1 * | 4/2001 | Chen | ...................... | A62B 23/06 128/205.27 |
| 7,354,467 B2 * | 4/2008 | Chen | ........................ | A61F 5/08 128/204.12 |
| 7,390,331 B2 * | 6/2008 | Santin | ....................... | A61F 5/08 606/199 |
| 10,946,224 B2 * | 3/2021 | Strobl | .................... | A61M 11/02 |
| 2003/0106556 A1 * | 6/2003 | Alperovich | ............ | A62B 23/06 128/206.11 |
| 2005/0150385 A1 * | 7/2005 | Huang | ................... | A41D 13/11 96/69 |
| 2009/0020125 A1 * | 1/2009 | Chang | .................... | A62B 23/06 128/206.11 |
| 2015/0238785 A1 * | 8/2015 | Chuang | .................. | A62B 23/06 128/202.27 |

* cited by examiner

*Primary Examiner* — Steven O Douglas

(57) ABSTRACT

A Personal Protective Equipment that fits in the Nose of living species, especially human beings, this nose mask is designed for ease of use, comfort to the user, and most of all to filter harmful viruses, bacteria, other filterable microbes, dust particles, and prevent them from entering into their nostrils, thereby protecting the user and preventing them from contracting diseases such as but not limited to COVID-19 (largely known as the novel corona virus during the years 2019 to 2021 pandemic time period), while they are at work, outside, and/or indoors, to ensure that they lead a healthy life. Additionally this Personal Protective Nose Mask can be used for betterment of health by patients, under a Physician's care/treatment who are prescribed inhalable medicines.

5 Claims, 12 Drawing Sheets

PERSONAL PROTECTIVE NOSE MASK

BACKGROUND OF THE INVENTION

Various types of PPE* Masks are known in the prior art whose purpose is to protect the mask wearing user from airborne viruses and bacteria, wholly from harmful microbes. Whereas the masks are usually uncomfortable to wear, and if they are comfortable, they don't fully protect the user from microbes, due to the fact that human face is a complex structure and so designing an enclosure covering the Nose and mouth in full and at the same time permitting the person to breathe freely and naturally is difficult. i.e. the person has to breathe the air that gets filtered by a regular PPE Mask; thereby a noticeably slow intake of air into their nostrils because, only so much filtered air can through the fabric, thereby undeniably a discomfort to the regular PPE Mask user. During the year 2019 to 2020 a deadly pandemic hit the World and loomed all across the Earth which was/is being caused by COVID-19 (largely known as novel corona virus), this discomfort (of wearing a PPE Mask or any other type of mask such as N95, etc. . . . ) was/is being experienced by almost any person who has to go to work especially Emergency work professionals, mainly Physicians, Doctors, Nurses, and health care workers, or common people, who needs to get out of their home to buy regular necessities such as groceries, and return home without contracting the virus inside their body. It should be noted that the respiratory disease and subsequent diseases caused by COVID-19 is fatal, as it has claimed the life of many, regardless of their age: from elderly to children, if early/timely remediation is not done by approaching Hospital and if the right Physician/Doctor's care is not obtained. Early detection of COVID-19 can be done by confirming the symptoms that are being advised by the CDC and W.H.O. To emphasis the serious nature of this disease, at the time of this writing, the number of people who lost their lives due to the disease caused by COVID-19 stands at 1.46 Million worldwide, and 268,000 lives in the U.S. alone (Source: Google's COVID-19 tracker). For the records, this statistics above is provided here to prove the seriousness of this COVID-19, a deadly virus, and sadly the number is growing daily, worldwide. Hence, the wearing of safety gears is of utmost importance, and strictly following the health guidelines as advised by their respective National Government's Health Departments and World Organizations such as the C.D.C (Center for Diseases Control, USA), and the W.H.O (World Health Organization), is very vital not only for the individual's safety, but more importantly to help contain/prevent the mass spread of the virus, as its airborne.

*PPE—Personal Protective Equipment

This personal protective nose mask, is not only useful and protects the common people but mainly the Doctors, Nurses, and health care workers who deal with the patients daily, especially who have deadly and contagious diseases such as but not limited to COVID-19. Thus is the huge potential and great importance of nose mask, once it is manufactured and sold in the U.S. and rest of the World. There are some notable features which makes this present invention (Nose Mask) unique. The strength of the mask's filtering capability (i.e. filtering out harmful microbes contained in the air that is about to be inhaled, right before it reaches the lungs) is the prime feature. Comfort of wearing the present invention is the next main feature. Another key and important feature in terms of comfort to the person wearing the present invention is, it uses a disposable unique pair of objects which are filters similar to cigarette filter tips, and can be made of the same or similar type of material like cellulose acetate, which are used to produce cigarette Filter tips.

FIELD OF THE INVENTION

The present invention relates to a personal protective nose mask whose purpose is as its name implies: "a mask for the human nose", and it can be extended and customized for use by other living beings, such as animals as well. This nose mask includes a light weight shell member made of durable at the same time soft substance such as but not limited to rubber, a mixture of rubber and HDPE/Plastic2, so that the more softer and polished the outer edge, the more comfortable and second nature (an instinctive habit) the wearer would like to use it regularly, thereby benefitting from nose mask's health benefits daily. The shell member consists of two cylindrical compartments long enough (not longer than) to fit in the nostrils of the person wearing/using it. These two compartments are joint by a loop shaped connector made also of the same material/substance with the same qualities of the compartments. Filters, as briefly explained in the BACKGROUND OF THE INVENTION section above, are inserted into each compartment, and they serve, as their name implies, purifying the air inhaled, each and every time. As can be imagined, the present invention thus configured, can be worn by the user into their nose by grabbing its connector and inserting it into their nose slowly. Once insertion is complete, the present invention is designed in such a way that it snugly fits in the person's nose. Mainly, and in an effort to ensure that the user of the nose mask gets the look and feel as comfortable as they would while not wearing the present invention, the user can wear a regular mask (N95—[Not resistant to Oil and blocks at least 95% of very small [0.3 μm{micron} particles], KN95[one of the type of face masks originating from China similar to N95], or any other FDA-[United States Food and Drug Administration] recommended mask) normally (on top of the present invention), only to prevent occasional conditions where a long sneeze that could make the nose mask eject out of the nose. It should be noted that as the regular mask wraps the face especially the nose, it goes without saying that while the user, through natural instinct: sneezes, they will comfortably sneeze and the nose mask stays in the nose, or even if it ejects out of the nose due to the force of a long sneeze, it will be contained inside the regular face mask, as a fish would be caught in a fishing net, but otherwise the nose mask fits snugly and sits in the user's nose, filtering the incoming air draft while the user inhales, thereby preventing the intake of harmful microbes in each and every breath. For medical reasons, as a Doctor would recommend that if the protective nose mask and/or filters eject out of the nostrils due to a long sneeze, and it's importantly advised to discard the filters and also wash the protective nose mask shell member, before next use. i.e. the filters are for one time use only.

The nose mask thus worn can be removed without any effort in the same manner how the user inserted into their nose, by grabbing the extant connector and by pulling out the nose mask gently. Once pulled out, both the filters needs to be discarded to a closed trash can at once. Then the nose mask along with the lids needs to be washed/rinsed thoroughly with some common foamy soap and water, dried with a fresh cloth towel (for conserving natural resources), or a paper towel, and stored in a small plastic box/container compactly, when not necessary. In other words, in maintaining personal hygiene for the larger purpose of containing the spread of viruses, especially the virus that has potential to be as deadly as COVID-19 (progressive and certain, as can be understood by the real statistics that has been provided in the BACKGROUND OF THE INVENTION section above, at the time of this writing (the year 2020 A.D.)), extra care should be followed in removing and discarding the used filters safely as explained above, same as the personal hygiene practice of washing hands thoroughly for at least 20 seconds (twenty seconds) as soon as entering home, or in other words, as the very first duty after returning from outside, must be followed, or the purpose of the present invention, a personal protective nose mask will be in vain.

The quick and easy to use present invention (nose mask), its usage, and instructions on how it needs to be worn, and removed after use, is again discussed further in the sections that follow.

SUMMARY OF THE INVENTION

The general purpose of this present invention described in subsequent detail, is to provide an added protection/shield to human beings that filters and thereby purifies the air from harmful microbes inside the nostrils, right before the volume of air enters inside the trachea (windpipe), thereby preventing the microbes from entering inside the human body, thus protecting the person wearing the personal protective nose mask (present invention).

The present invention is a unique design that adds an extra layer of protection for human beings, and has been designed to help the Physicians (Doctors), Surgeons, Nurses, and Pharmacists while they perform their daily crucial duty as a timely Savior, of attending to and treating COVID-19 patients, importantly rescuing them from the brink of death in mature cases. Thus, this nose mask has been especially designed by keeping in mind that the healthcare workers, especially some Doctors and Nurses who lost their lives by contracting the same COVID-19 disease after attending to/caring COVID-19 patients as a part of their daily duty during the entire year 2020 (at the time of this writing). The present invention is so unique and has a promising potential to become a healthcare industry standard and could be recommended by the World Health Organization (W.H.O), mainly to become a day-to-day common use in the Health-Care Facility environment, for the aforementioned benefits.

Similar to as explained above, the present invention's benefits has great potential to be and is capable of being used by people from all walks of life—from an elderly stay-at-home senior citizen with some health condition such as but not limited to heart-attack or diabetes, to a healthy sportsman, who exercises by running, jogging, cardio, weight lifting, etc. . . . The key point about the present invention is, the user of the nose mask will have a noticeably better breath comfort, i.e. a better breath in, and better breath out, which is a great feeling by wearing the present invention (nose mask), compared to simply wearing the face mask alone.

On a very important note relating to breathing, and undeniably the human beings cannot live without breathing air, and any slight level of restriction to breathe is not normal. As almost everyone is experiencing the daily pain of wearing a regular type of face mask (a PPE-[personal protective equipment] mask, an N95, KN95, etc. . . . ) during the pandemic in the year 2020 (at the time of this present invention application), once a person continues breathing after wearing the present invention, and through the personal protective nose mask (present invention), they would definitely agree the benefit and the great comfort the present invention gives, and that person will vouch its benefits such as but not limited to, "it is very easy to breathe", "now I don't feel that annoying irritation of my breathe getting blocked/restricted by the face mask while I inhale", "My breath really feels better than (yes) regular breathing, inhaling and exhaling while wearing this nose mask", and many more praises about the comfort level they will certainly feel.

Thus, as explained above, the unique features of the present invention can be summarized as below. The present invention, a personal protective nose mask, when worn in the nose overlaid with a face mask preferably, a cloth mask covering the face, absolutely provides a great comfort in breathing as close to normal breathing, and in almost all cases, an additional layer of comfort than regular breathing due to its unique design(i.e. the person will feel much satisfied breathing through the nose mask, rather than without the nose mask: further explanation in next line), at the same time and more importantly filters out dust, allergens, and specifically microbes (which is the main purpose of the present invention). The present invention's nose mask acts as a nose vent which enlarges the human nostrils naturally, thereby noticeably increasing and allowing more volume of air inhaled and exhaled in each breath, respectively.

BRIEF DESCRIPTION OF THE DRAWINGS

Figures

DETAILED DESCRIPTION OF THE DRAWINGS

Figure 1:
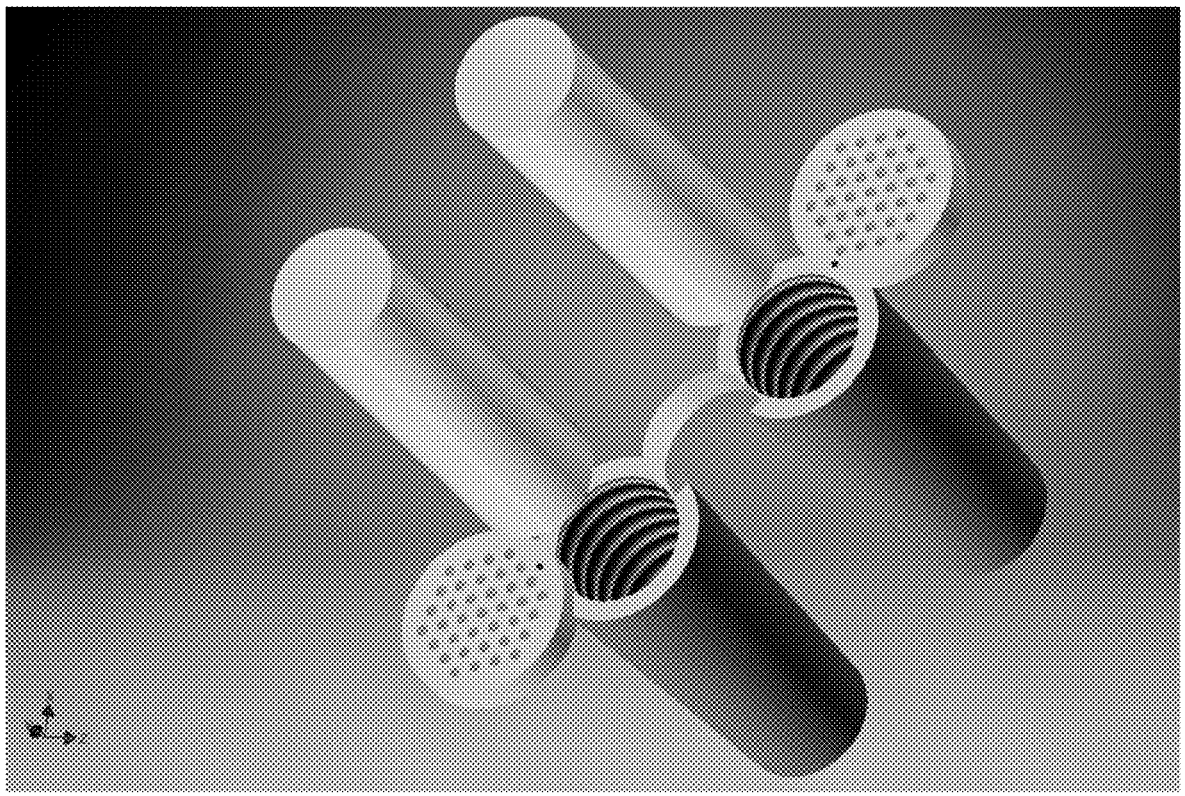
FIG. 1 is a 3D view of present invention and all its components (i.e. personal protective nose mask)
Figure 2:
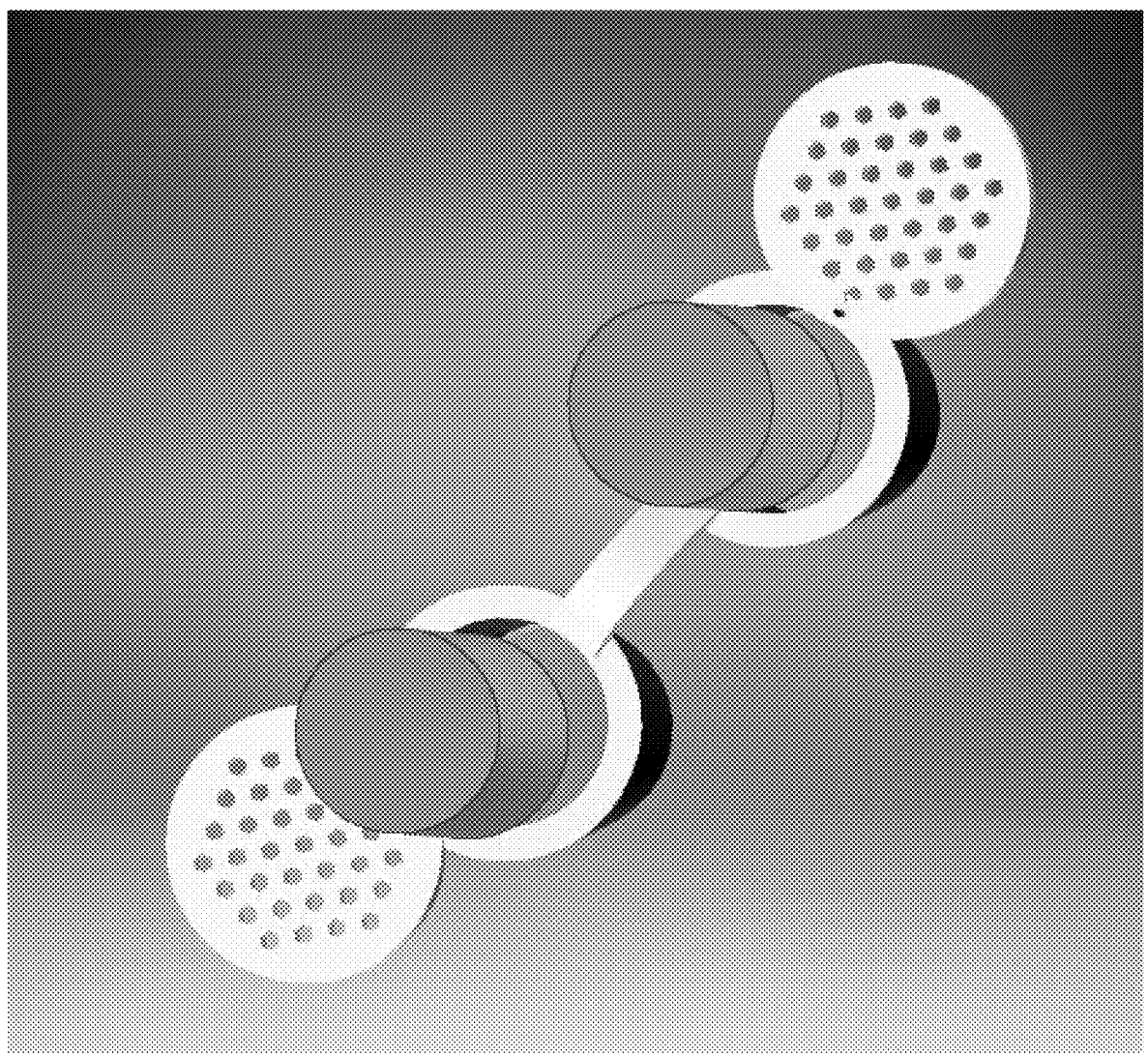
FIG. 2 is an aerial 3D view of present invention, both filters selected
Figure 3:
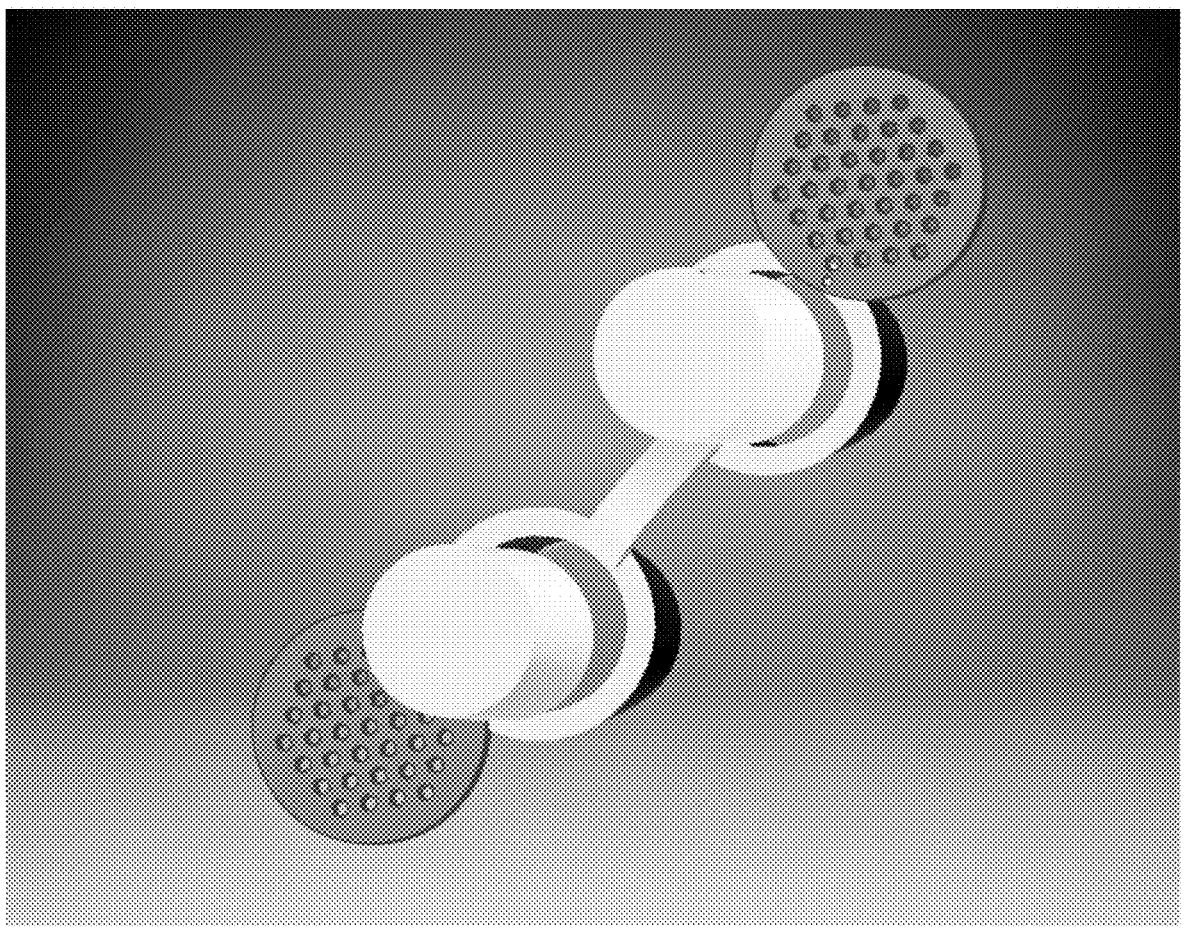
FIG. 3 is an aerial 3D view of present invention, both lids of nose mask selected
Figure 4:
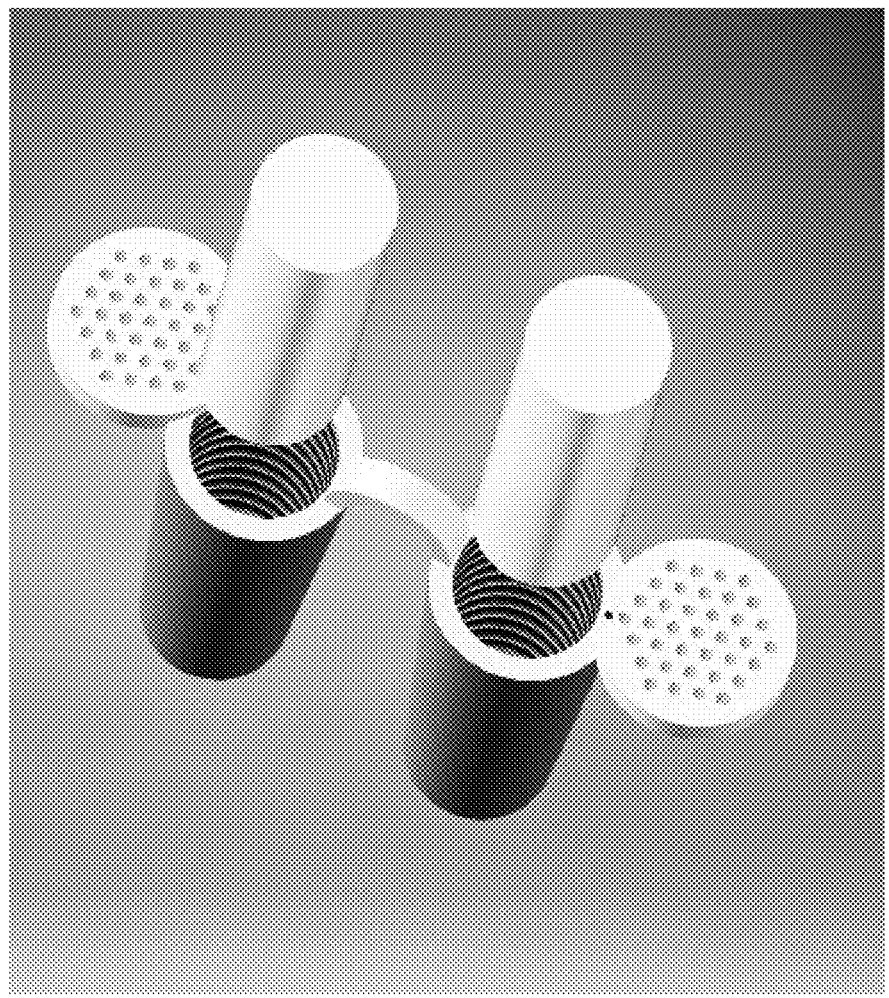
FIG. 4 is an aerial 3D view of personal protective nose mask, displaying both filters
Figure 5:
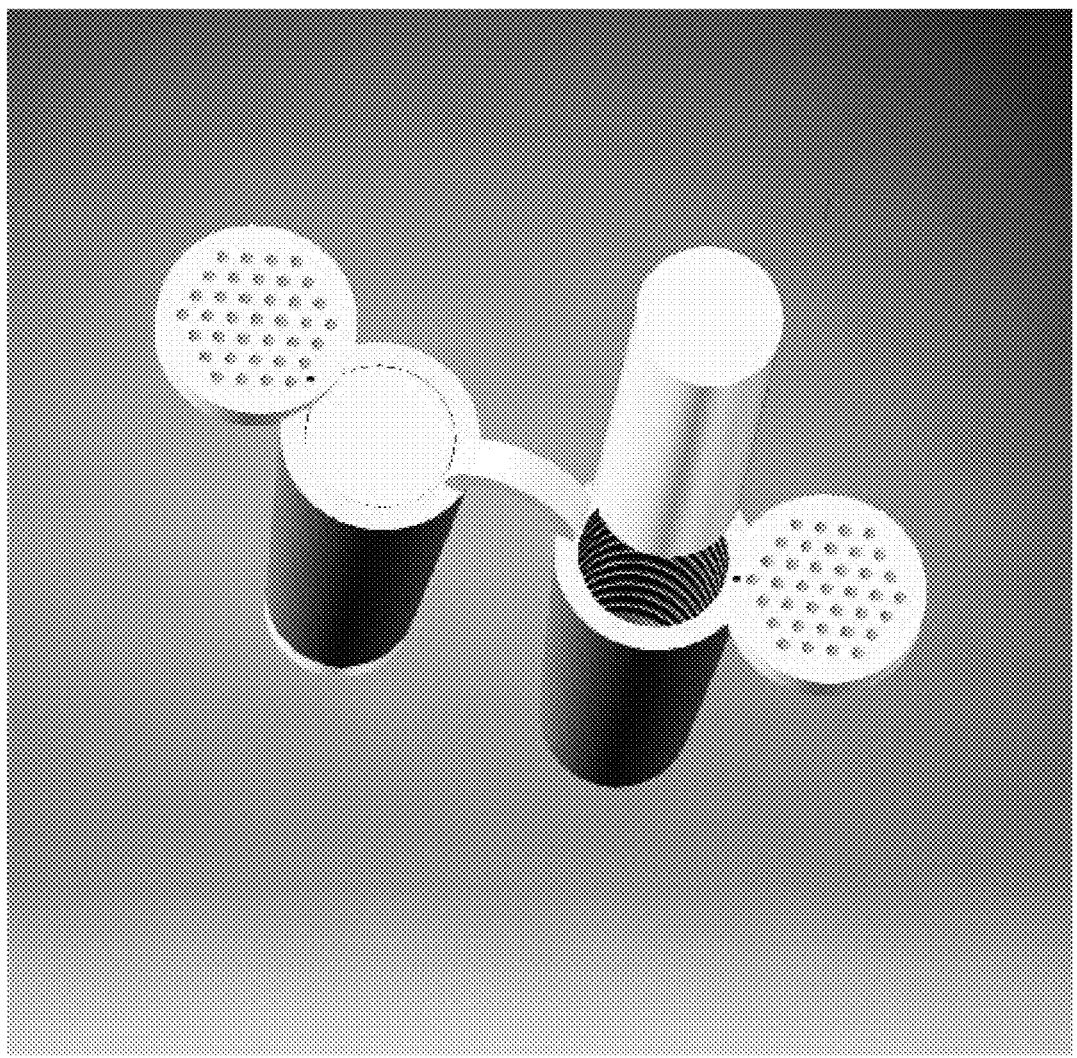
FIG. 5 is an isometric view of present invention, filters "about to be inserted" into vents
Figure 6:
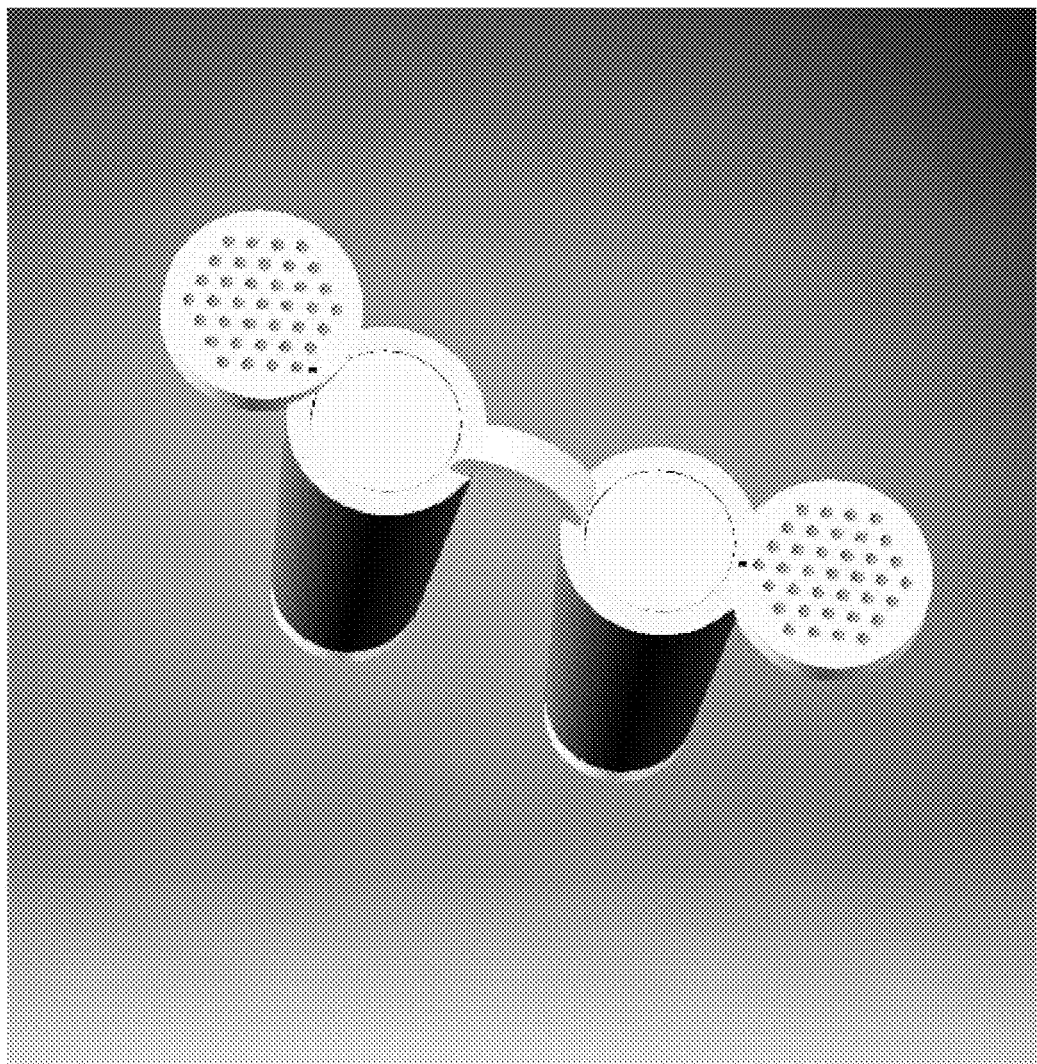
FIG. 6 is an isometric view of present invention, left side filter inserted into a vent
Figure 7:
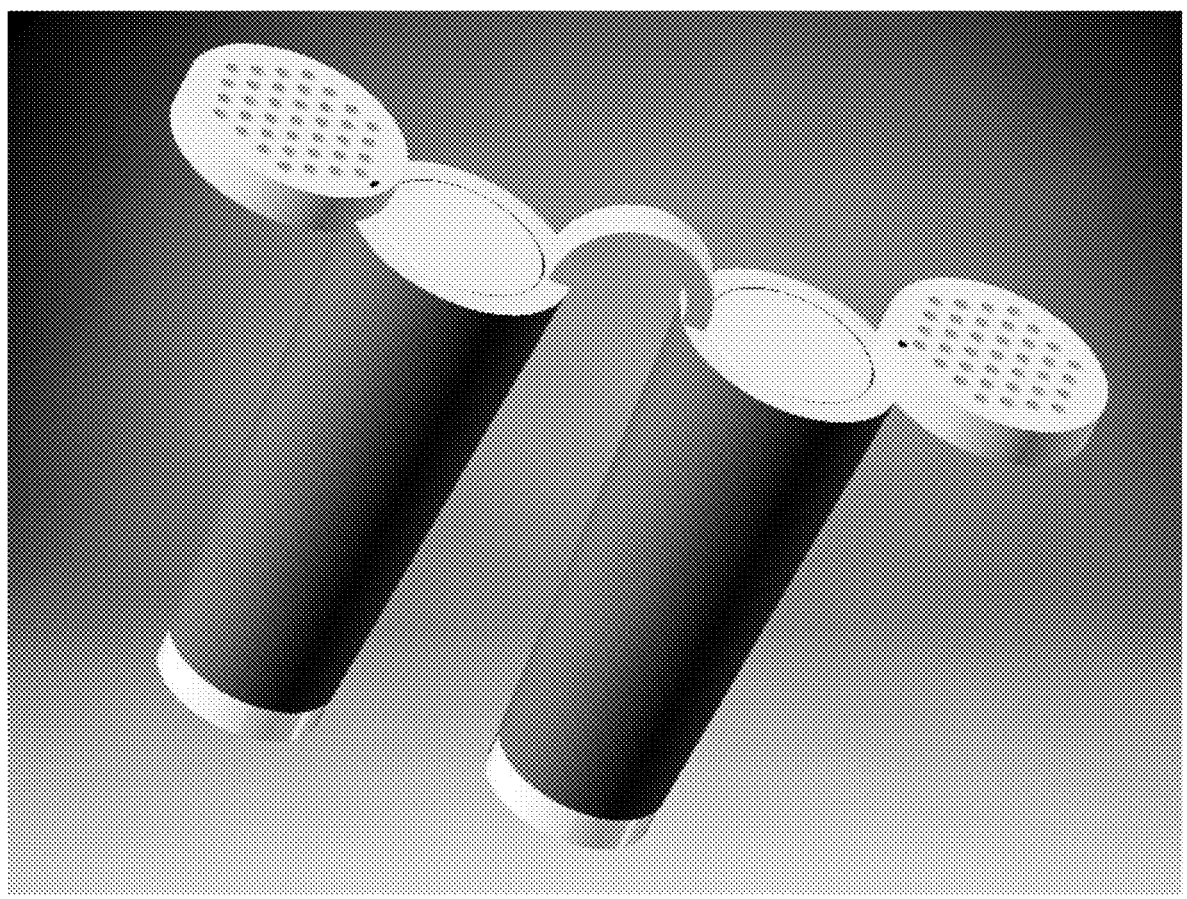
FIG. 7 is an isometric view of present invention, right side filter inserted into another vent (both filters fully inserted into the nose mask vents)
Figure 8:
FIG. 8 is another view of personal protective nose mask, inserted filter showing up in the opposite end
Figure 9:
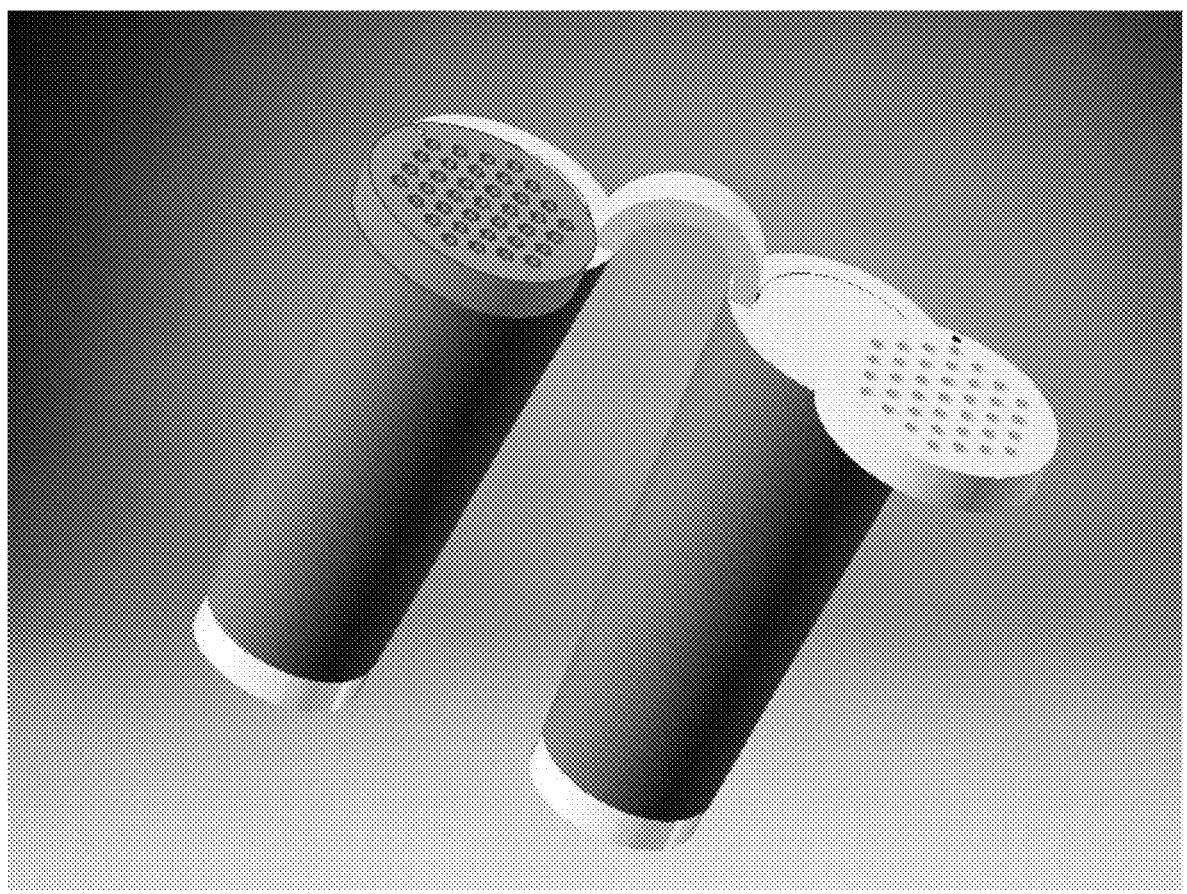
FIG. 9 is a view describing the Nose Mask lids for filters in a "Starting to Close" position
Figure 10:
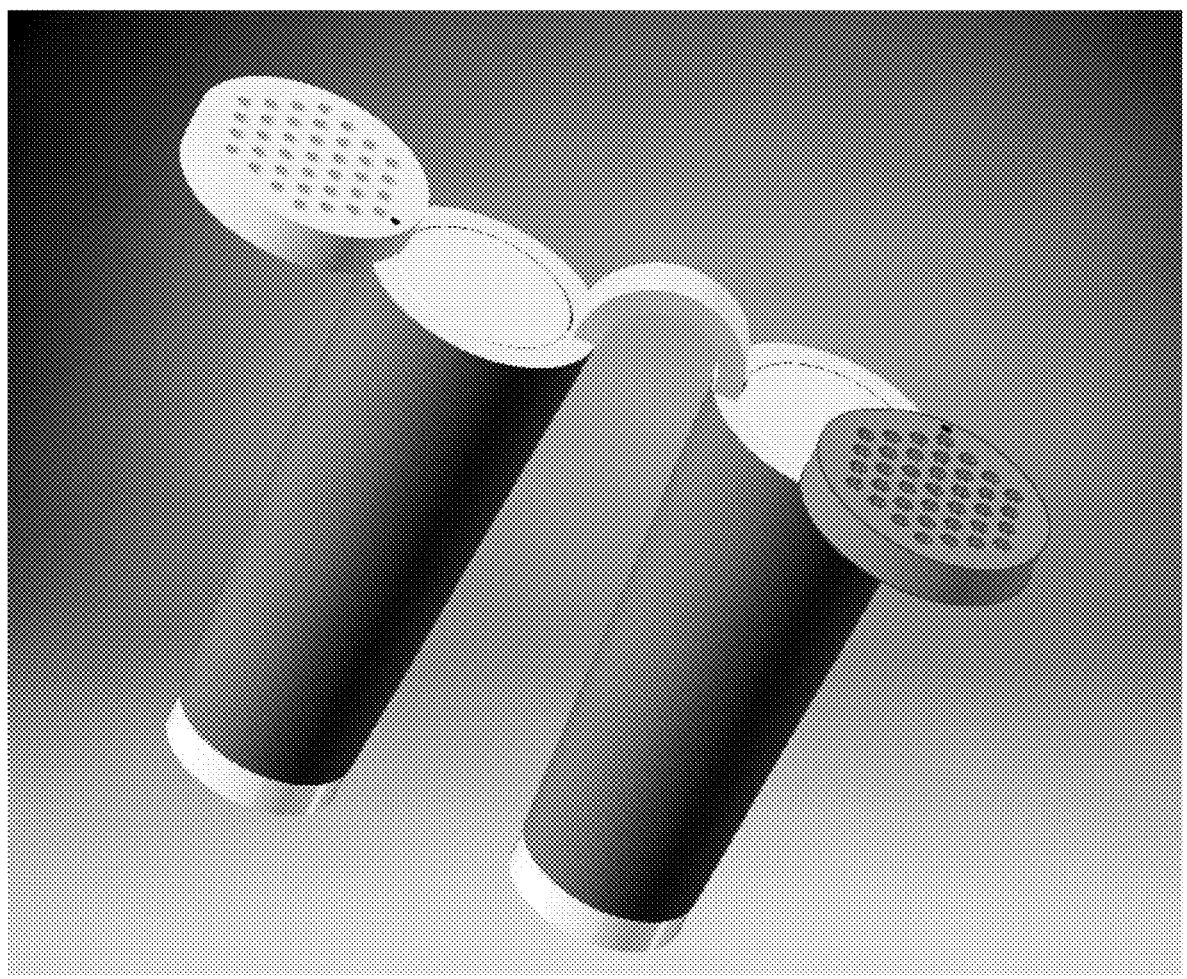
FIG. 10 is a view of the present invention displaying one of the lids in an "Almost to be Closed" position
Figure 11:
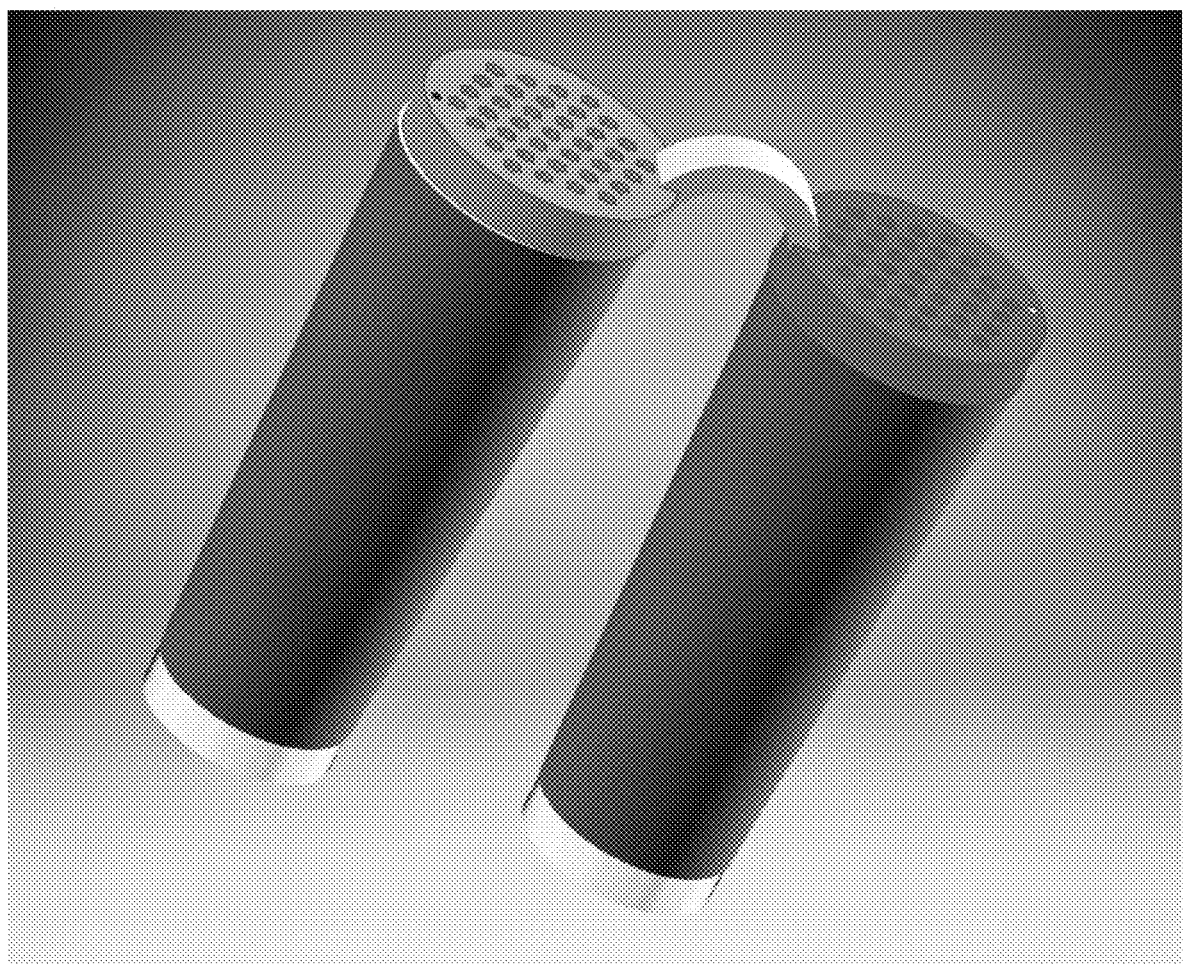
FIG. 11 represents a view of the nose mask (present invention) where both the lids are in a completely closed position
Figure 12:
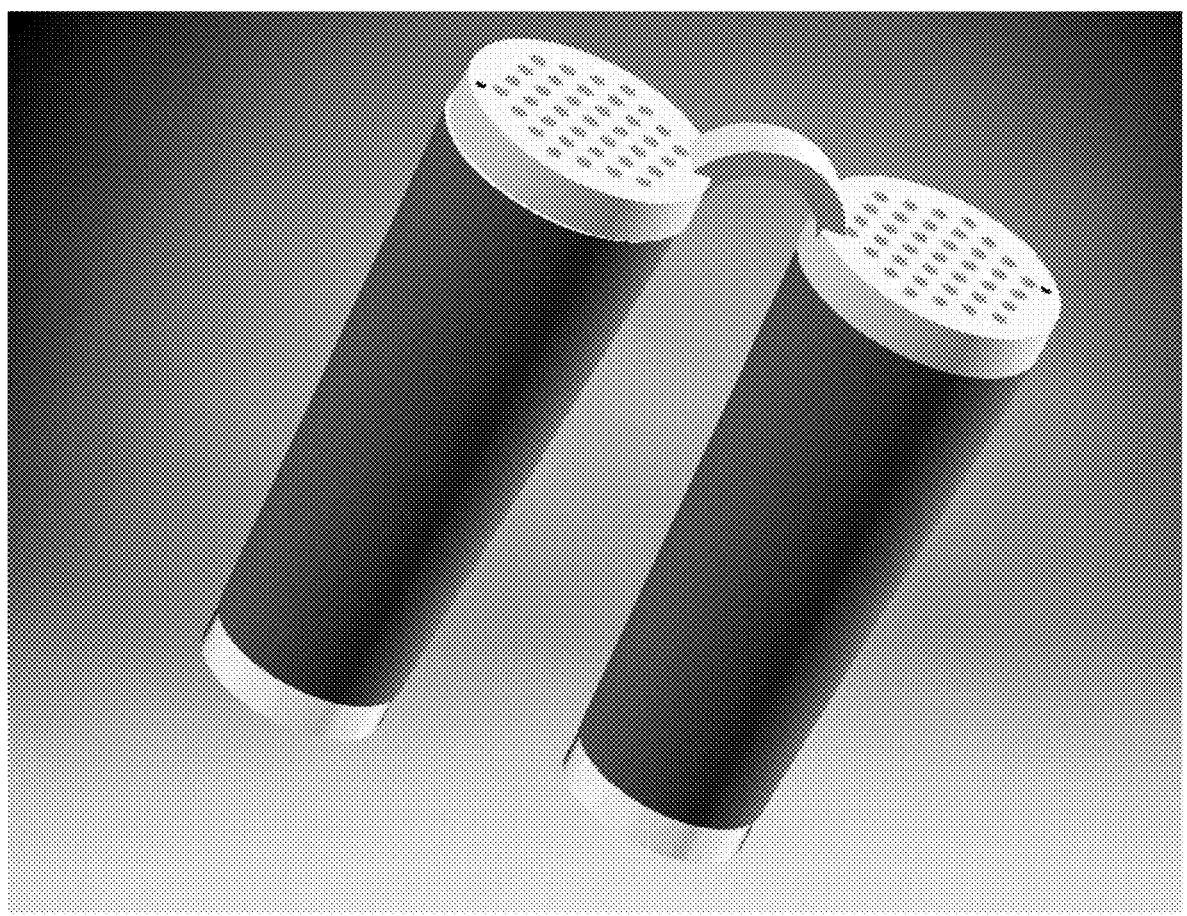
FIG. 12 shows the view where the personal protective nose mask is in a ready to use state

With reference now to the drawings, and in particular FIGS. 1 through 12 thereof, example of the personal protective nose mask and its parts, employing the principles and concepts of present invention and generally designated by the reference number 300 will be described.

Referring to FIGS. 1 through 12, a preferred embodiment of the present nose mask 300 is illustrated.

As described in the summary section above, the present invention nose mask 300, has been designed to protect any human being, especially doctors, nurses, and healthcare workers caring patients who have contracted not only contagious diseases but mainly serious and potentially fatal diseases such as but not limited to COVID-19 (Corona Virus Disease-Year 2019). The benefits, features, and purposes are described in detail below, and in other sections above, with further granular detail.

The present invention, a personal protective nose mask consists of a set of soft, flexible, non-rigid cylindrical tubes FIG. 1 thru FIGS. 12 M-T1 and M-T2 that comfortably fits human nostrils, co-ordinated and connected by a flexible connector FIG. 1 thru FIG. 12 M-C, also made of the same material as the tubes. The material for the present invention's shell as explained above can be any kind of durable material that comforts the person wearing it, preferably hardened latex based as historically and to date, devices and/or appliances that needs to be worn by hospitalized people or patients under treatment are usually latex based as its natural, easy and comfortable. Alternately the present invention's nose mask shell can also be made of non-latex based ductile material so as to cater persons who are allergic to latex/rubber. As can be imagined and understood the application of this nose mask 300, whose purpose is to protect any healthy individual from harmful and more importantly deadly viruses and similar microbes, either when they are outside let's say in a hospital visiting a physician for their regular physical appointment, or outside shopping for their daily groceries, or even inside their home along with a family member who is known to have contracted a contagious disease like COVID-19. The main purpose of this present invention (nose mask) 300 has already been explained in the sections above, which is to provide an added protection to the doctors and nurses whose daily duty is to treat, and take care of patients affected by deadly diseases such as but not limited to COVID-19, and most importantly cure them from the disease until they are close to normal so they can be discharged from the health care facility/hospital, back to their residence.

Talking about the nose mask filters FIG. 1 thru FIGS. 12 F-1 and F-2, they are chosen specifically for their capability of filtering nano particles, and they consist of cellulose acetate fibers which are relatively inexpensive, similar to or same as those filters used in the tip of a typical cigarette filter. However extra care must be taken in selecting, choosing existing pre-manufactured filters for use in conjunction with the present invention (nose mask), or alternately and preferably manufactured solely for the purpose of nose mask. There are a few reasons for designing and manufacturing brand new filters with specific features for use in the present invention, a personal protective nose mask.

Those reasons are listed as follows.
1) While there are ongoing research and studies about cigarettes, specifically cigarette filters FIG. 1 thru FIGS. 12 F-1 and F-2, both independently and by the cigarette manufacturers themselves, as early as the year 1959, common cigarette filters, thereby cigarette smoking are known to contribute to cause lung cancer.

How do cigarettes contribute to cancer?

It's been widely learnt from aforementioned research that >90% of cigarettes used, come with filters, which are made of cellulose acetate fibers. And these fibers, in, during and after the manufacturing and packaging processes, are known to be left with loose fiber particles (resulting from the cutting, joining, etc. . . . ), which still are present in the cigarette tip. As can be understood, a smoker smokes one of these cigarettes and when he/she inhales the cigarette, in goes those micro fibers, without the smoker knowing. That is not all. For the purpose of further understanding, mainly as this concerns the human population's invaluable health, thinking in science terms, these loose fibers, if tracking a single strand of fiber, would melt in the hot temperature of the burning cigarette, and will enter from the cigarette into the lungs, causing harm to the body, which eventually results in cancer. As one can imagine, the harmful effects to human body that is caused by a defective cigarette/filter is insurmountable. To solidify the understanding and result, which is an outcome of almost continual research which started around sixty years ago, some of the research milestones are provided below (Courtesy: Cigarettes with defective filters marketed for 40 years: what Philip Morris never told smokers: J L Pauly, A B Mepani, J D Lesses, K M Cummings, R J Streck)

| | |
|---|---|
| 2000 | Survey documents that most all smokers (>95%) perceive that inhalation and/or ingestion of cellulose acetate filter fibers is an additional risk to that known to be associated with cigarette smoking and that tobacco companies have an obligation to inform smokers of this defect. Smokers believe that tobacco companies should advise smokers of filter defects |
| 2000 | Fibers, particles, and other filter elements discharged from the filter into mainstream smoke identified as the "third phase" of cigarette smoke |
| 1998 | Borowicz and colleagues report results of tests in which cellulose acetate filter fibers and particles are recovered from mouth washes of all smokers and for all cigarettes tested |
| 1998 | Filters of novel cigarette appearing nicotine delivery devices are shown to be contaminated with glass fibers and particles (Premier, Eclipse and NEW Eclipse) |
| 1998 | Inhaled cellulosic and plastic fibers found in human lungs |

For the full list of research outcomes, the reader may refer to the Research Paper specified above. As the purpose of this specification is none other than detailing the present invention: the personal protective nose mask's specification continues below. Having said the above, definitely the filters to be used with the present invention is recommended to be not the same type of filters used in the cigarettes, but more refined ones. i.e. filters with zero defects, as otherwise using of filters with any defect(s) in the nose mask will defeat the whole purpose of the present invention itself, which has been invented solely to shield human beings from harmful microbes such as deadly viruses, and to prevent them from contracting airborne deadly diseases, ensuring that the users lead a happy, healthy life.

2) The filters as shown in FIG. 1 thru FIGS. 12 F-1 and F-2 must be 100% defect free, and equally important, must also be able to filter viruses and other harmful microbes. As per recent studies after the worldwide pandemic that started in the year 2019, each SARS-CoV-2 virion is approximately 50-200 nanometers in diameter, whereas the hydrodynamic particle diameter of cigarette smoke captured by regular cigarette filters had been estimated to be only around 0.44 micrometers or 440 nanometers. Hence, filters manufactured to be used with the present invention needs to be denser (i.e. packed with more number of cellulose acetate fibers in the filter, approximately double the amount or more than double the amount of fibers in the existing cigarette filters), thereby able to filter out the COVID-19 virus from entering inside the human body. Size range of the particular virion and the smoke particles were extracted from research papers whose references are as follows.
Reference #1: https://tobaccocontrol.bmj.com/content/11/suppl_1/i51
Reference #2: https://www.hindawicom/journals/jo/2011/819129/3)

3) The tube pair and filter pair as can be seen in FIG. 1 through FIG. 12-M-T1 M-T2, and F-1 F-2 respectively, are designed to be cylindrical such that its naturally lodges inside the human nostrils, occupying the nostrils tightly thereby preventing unfiltered air from entering inside the nostrils interior. In other words, while wearing the fully configured extant nose mask, when the person breathes, the only way air can enter inside the nose is via the filters alone. It should be noted that the present invention is quick and easy to use surely, and at the same time comfortable to wear and remove, thereby the general public too quickly getting accustomed to using the present invention.

FIG. 1 depicts a view where the nose mask M and its components, two lids M-L1 and M-L2 are wide open. The purpose and benefits of these sliding lids M-L1 and M-L2 are twofold, one is to hold each inserted filter tightly in place, and prevent it from falling down, and two is to be the strong front interface through which the air is inhaled into the human body and vice versa. The present invention's lids FIGS. 1 M-L1 and M-L2 are designed to be made of Plastic 2 also called HDPE (high-density polyethylene), or any other similar quality substance. Quality of Plastic chosen, thus specified above is important to be pure so that the plastic does not leach any chemical during the inhalation of air process. The HDPE described in the line above is the same type of Plastic used in food storage, and food packaging, etc. . . .

Each lid FIG. 1 through FIGS. 12 M-L1 and M-L2 are joint to the extant nose mask's tube FIG. 1 through FIGS. 12 M-T1 and M-T2 respectively, by sturdy stems FIG. 1 through FIGS. 12 M-S1 and M-S2 respectively. The lids thus attached to the nose mask's tubes FIG. 1 through FIGS. 12 M-T1 and M-T2 have revolving capability, and the present invention's each lid (FIG. 1 through FIG. 12 M-L1, M-L2) is designed to rotate in the axis of the stems. These lids snugly fit to the tubes in such a way that they are not loose but finger tight (i.e. easily handled with fingers while closing the lids after insertion of filters FIG. 1 through FIGS. 12 M-S1 and M-S2 respectively. The lids thus attached to the nose mask's tubes FIG. 1 through FIGS. 12 M-T1 and M-T2 have revolving capability, and the present invention's each lid (FIG. 1 through FIG. 12 M-L1, M-L2) is designed to rotate in the axis of the stems. These lids snugly fit to the tubes in such a way that they are not loose but finger tight. (i.e. easily handled with fingers while closing the lids after insertion of filters FIG. 1 through FIGS. 12 F-1 and F-2, and also while opening the lids to remove the filters after each use), for ease of use, each and every time.

The present invention's stems M-S1 and M-S2 are made of hardened plastic and can be Plastic 2/HDPE as well, similar to the material nose mask M is made of. Overall, nose mask M should be made of a non-leaching good quality material such as HDPE/Plastic 2. As a variation, the nose mask M thus manufactured above could also be coated with soft rubber for additional comfort, so the user feels natural to wear the extant nose mask (present invention).

The nose mask M thus worn can be removed without any effort in the same manner how the user inserted into their nose, by grabbing the extant connector M-C and by pulling out the nose mask gently.

The soft filters FIG. 1 through FIGS. 12 F-1 and F-2 as can be imagined, are one time use only (use and throw), and are meant in no way to be reused. Hence, after taking away the nose mask, the user simply follows the steps as described in FIG. 12 through FIG. 1, (i.e. in reverse of the insertion order FIG. 12, FIG. 11, FIG. 10, up to FIG. 1), thereby pulling each filter F-1 and F-2 from its lid end (M-L1 and M-L2) removing and discarding the used filters, and next is to clean the nose mask along with the lids thoroughly using soapy water, hand soap or body wash and drying the nose mask by using a fresh cloth towel, or paper towel, before next use.

What is claimed is:

1. A personal protective equipment, a nose mask, comprising:

a pair of cylinders, collectively called nose mask shell members comprising a first cylinder and a second cylinder, the said cylinders are conical, each said cylinder about the same size to fit in a human nostril, first cylinder connected by a flexible connector to the second cylinder, the said connector being a holder to insert the said nose mask shell members inside the nostrils, and to pull out the said nose mask shell members together, after use;

wherein each cylinder of the said nose mask is conical for snugly fitting into the human nostril;

wherein the said nose mask shell member and the said connector being made of material(s) selected from a group consisting essentially of flexible HDPE/Plastic 2;

wherein the wider mouth end of each said cylinder is attached with a lid, and the said lid being made of material(s) selected from a group consisting essentially of hardened plastic like HDPE;

whereby each said lid is rotatable 360° degree in the axis of a stem and the said stem holds the respective cylinder and lid together, said first stem and said second stem being made of material(s) selected from a group consisting of HDPE and/or Plastic2;

whereby each said lid locks in place when closed, fully covering the respective mouth of said first cylinder and second cylinder, each said lid keeps the said filter tight without any movement.

2. The mask device according to claim 1 comprises a pair of filters, a first filter for said first cylinder, and a second filter for said second cylinder, each said filter fully inserted into each said cylinder via the wide mouth end to the narrow mouth end; the inserted said filters held firmly by the tight grips with the inner wall of said cylinders;

wherein each said filter thus inserted projects slightly outside the narrow end of said cylinder; the said pair of filters touches the internal end of the nostril (inner nose); wherein the said filters comprises of cellulose acetate fibers, the said filters having a shape and size that is substantially similar to a conventional cigarette filter.

3. The said filters according to claim 2 recommended to be manufactured with at least double the density of fibers present in conventional cigarette filters;

wherein doubling of the fiber density means the hydrodynamic particle diameter of cigarette smoke filtered by a regular cigarette filter is around 0.44 micrometers or 440 nanometers, whereas the SARS-COV-2 virion is tinier in size approximately 0.05-0.2 micrometers or 50-200 nanometers in diameter;

whereby the said filters described hereinabove lodged in the said cylinders filters out dust particles and microbes including, but not limited to the COVID-19 virus, preventing the said microbes from entering inside the human body during 24×7×365 (read as 24 hours by 7 days a week throughout the year) inhalation process of any human being;

whereby the intake of air/inhalation via the said nose mask device is fresh, pure and filtered, providing a natural breath to the user of nose mask device, each time;

wherein the said fibers being made of cellulose acetate or a similar chemical composition, said fibers arranged in a dense packing inside a cylindrical sheet; each said sheet being made of HDPE/Plastic 2 or any pure hard paper; the said filters being recyclable and the production of said filters being low in natural resources consumption.

4. The said first filter and second filter according to claim 3 each consists of two sections, an outer section and an inner section means a packet of atmospheric air enters through/flows from front end of the said outer section; the said backend of the said inner section touches the inner most side of the extant nostril;

wherein the said filters comprise a central layer of denser fibers;

wherein the said central section is filled with a viscous liquid having germ-killing properties and is safe for inhalation in small amounts during daily use;

whereby the said viscous liquid must not cause any side effects when inhaled for a long duration for example 4 to 7 days a week which are common working days in the current world;

wherein the said viscous liquid being a mixture of a proven germ killer with healthy nutrients;

whereby usage of the present invention along with the said filters protects the user from harmful viruses including, but not limited to the COVID-19, but also in the process, makes the user healthier.

5. The personal protective nose mask device according to claim 4 being inserted into the extant nostrils and removed after use from the extant nostrils, by grabbing the flexible connector of said device;

wherein the said device being overlaid with a face mask when outdoors, to prevent the nose mask device from falling off to the ground after ejection, in cases such as a sneeze or a long sneeze, or while running;

whereby the nose mask device provides an added advantage of allowing inhalation and exhalation freely, letting more volume of air inside the extant nostril, thereby allowing the user to breathe more deeply and easily than with a regular face/cloth mask.

* * * * *